United States Patent [19]

Schöning et al.

[11] Patent Number: 4,777,012
[45] Date of Patent: Oct. 11, 1988

[54] GAS COOLED HIGH TEMPERATURE REACTOR CHARGED WITH SPHERICAL FUEL ELEMENTS

[75] Inventors: Josef Schöning, Hambrücken; Claus Elter, Bad Durkheim; Hans-Georg Schwiers, Ketsch, all of Fed. Rep. of Germany

[73] Assignee: Hochtemperatur-Reaktorbau GmbH, Fed. Rep. of Germany

[21] Appl. No.: 292,603

[22] Filed: Aug. 13, 1981

[30] Foreign Application Priority Data

Aug. 13, 1980 [DE] Fed. Rep. of Germany ....... 3030510

[51] Int. Cl.[4] .................. G21C 7/06; G21C 11/06
[52] U.S. Cl. ......................... 376/265; 376/287; 376/381
[58] Field of Search ............... 376/381, 382, 265, 266, 376/288, 287

[56] References Cited

U.S. PATENT DOCUMENTS

| 2,812,303 | 11/1957 | Daniels | 376/381 X |
| 2,990,349 | 6/1961 | Roman | 376/381 X |
| 3,058,897 | 10/1962 | Slack et al. | 376/265 X |
| 3,123,532 | 3/1964 | Michel | 376/230 |
| 4,030,974 | 6/1977 | Neef | 376/381 |
| 4,234,384 | 11/1980 | Fritz et al. | 376/381 X |
| 4,302,293 | 11/1981 | Elter et al. | 376/381 |

FOREIGN PATENT DOCUMENTS

| 0601366 | 7/1960 | Canada | 376/265 |
| 2241873 | 3/1974 | Fed. Rep. of Germany . | |
| 2347817 | 4/1975 | Fed. Rep. of Germany . | |
| 2354540 | 5/1975 | Fed. Rep. of Germany | 176/58 PB |
| 2817541 | 10/1979 | Fed. Rep. of Germany | 176/58 PB |
| 2854155 | 7/1980 | Fed. Rep. of Germany | 376/381 |
| 2365531 | 9/7197 | Fed. Rep. of Germany . | |
| 2054246 | 2/1981 | United Kingdom | 376/381 |

Primary Examiner—Deborah L. Kyle
Assistant Examiner—Daniel Wasil
Attorney, Agent, or Firm—Robert J. Koch

[57] ABSTRACT

A gas cooled high temperature reactor with spherical fuel elements surrounded by a reflector utilizes at least one ceramic tube and at least one metal tube for removal of pebbles from the core of the reactor. Each cermaic tube is surrounded directly by a ring of graphite columns wherein a plurality of recesses house a number of rod-shaped boron bodies. Additional plate-shaped boron bodies may advantageously be located in the bottom layes of the reflector.

8 Claims, 2 Drawing Sheets

GAS COOLED HIGH TEMPERATURE REACTOR CHARGED WITH SPHERICAL FUEL ELEMENTS

The invention concerns a gas cooled high temperature reactor charge with spherical fuel elements with a reflector surrounding the pile of fuel elements on all sides with a hot gas collector compartment adjoining the bottom part (bottom reflector) of said reflector consisting of graphite columns, the hot gas collector compartment being bounded in the downward direction by the bottom layers of graphite blocks of the high temperature reactor with a charging means and a removal means for the spherical fuel elements wherein the removal means comprises at least one ceramic pebble removal tube passing through the bottom reflector and the bottom layers and a metal pebble removal tube ajoining the ceramic pebble removal tube underneath the bottom layers.

High temperature reactors having a core formed by a pile of spherical fuel elements that are continuously added to the core and removed after their burnup from the core are part of the state-of-the-art. Nuclear reactors of this type have very high gas temperatures in their lower parts, wherefore, only high heat resistant materials may be used in the bottom reflector, the bottom layers and the part of the pebble removal installation located within the core structure.

These materials are thus made of a ceramic material, such as graphite, but graphite cannot be exposed to high tensile and bending stresses. The forces of the reactor core are thus transmitted to a thermal shield made of a metal, preferably a cast metal, which is surrounding the entire reflector. In the removal installation for the spherical fuel elements only the part of the removal tubes located within the space enclosed by the thermal shield is made of a ceramic material. The continuing pebble removal tubes connecting the ceramic removal tubes with a scrap separator are made of metal for the sake of higher strength.

It has now been found that even the metal pebble removal tubes are exposed to high temperatures in the areas adjoining the ceramic removal tubes. This is the result of the fact that the fuel elements standing in front of the ceramic removal tubes and located in them are not completely burned up and are thus still generating heat. The temperature in the above-described area may thus be reduced only by eliminating or limiting the flow of neutrons in the ceramic pebble removal tubes.

It is known in the prior art (West German Offenlegungsshrift No. 23 47 817) to provide neutron absorbing materials in a nuclear reactor with spherical fuel elements and a single passage of the fuel elements through the reactor core in the roof reflector and/or the upper part of the side reflector in order to reduce the flow of fast neutrons in the areas exposed to doses of radiation of the reflector, thereby preventing damage to the graphite of the reflector.

There is also known a process for the operation of a high temperature reactor of the above-described structural type (West German Offenlegungsschrift No. 22 41 873) whereby the output distribution in the reactor core may be affected so that the axial output density declines only slightly in the downward direction. Such a mode of operation permits a higher load on the fuel elements which is utilized either for an improvement in the economy of the nuclear reactor or to increase its safety. A series of measures have been proposed to obtain this result, among others the addition of combustible poisons to the loading charge, whereby the generation of power output is transferred to the lower reaches of the reactor core. The combustible poisons may also be provided in the roof, bottom and/or side reflectors.

It is further known (West German Offenlegungsschrift No. 23 65 531) to improve the shutdown efficiency of absorber rods directly insertable in a nuclear reactor with spherical fuel elements and directly insertable absorber rods by a special measure without increasing the number of absorber rods or their depth of insertion. This measure consists of doping the graphite of the bottom reflector and the lower part of the side reflector with neutron absorbing substances. This thus represents a quasi-homogeneous poisoning of the lower range of the reflector. It has the disadvantage that the neutron absorbing substances are burning up in a very short period of time and their effectiveness is, therefore, inadequate for the life time of a nuclear reactor estimated at approximately 30 to 40 years.

Based on this state-of-the-art, it is the object of the invention to design a gas cooled high temperature reactor of the above-described type so that the temperature is sufficiently lowered from the core bottom to the metal pebble removal tubes so that the thermal exposure of the last-mentioned removal tubes remains within permissible limits.

This object is attained according to the invention by that each ceramic pebble removal tube within the area of the bottom reflector and the hot gas collector compartment is surrounded directly by a ring of graphite columns, wherein a plurality of recesses, a number of boron bodies is arranged.

The boron bodies reduce the neutron flux in the area affected to the extent that there is no more output by the fuel elements.

A further number of boron bodies may be provided within the area of the bottom layers of the high temperature reactor to reinforce the absorption of neutrons. The boron bodies are arranged preferably directly outside each ceramic pebble removal tube.

As a solution extremely favorable from an economic standpoint, the boron bodies are designed in the graphite columns in the form of rods and inserted into vertical bores adapted to their shape and size. Advantageously, the length of the boron rods is determined so that the graphite columns are almost entirely penetrated by the boron rods.

Preferably, the boron rods are arranged in at least two rows around each ceramic pebble removal tube and the boron rods belonging to different rows are staggered so that they always face a gap.

The boron bodies located in the area of the bottom layers may advantageously consist of solid plates arranged so that each ceramic pebble removal tube in this area is completely or almost completely surrounded by them.

The form of the boron bodies chosen and the mode of their location effect a gradual decline of the temperature in the direction of the metal pebble removal tubes, so that no or only slight thermal stresses are generated in the structural parts of the high temperature reactor. Furthermore, the boron rods and boron plates are readily built into the corresponding graphite structural parts (graphite columns or bottom layers). The realization of the invention thus does not require a substantial effort.

In the drawing, an embodiment of the gas cooled high temperature reactor according to the invention is represented in a schematic manner. The figures show individually:

Figure 1:
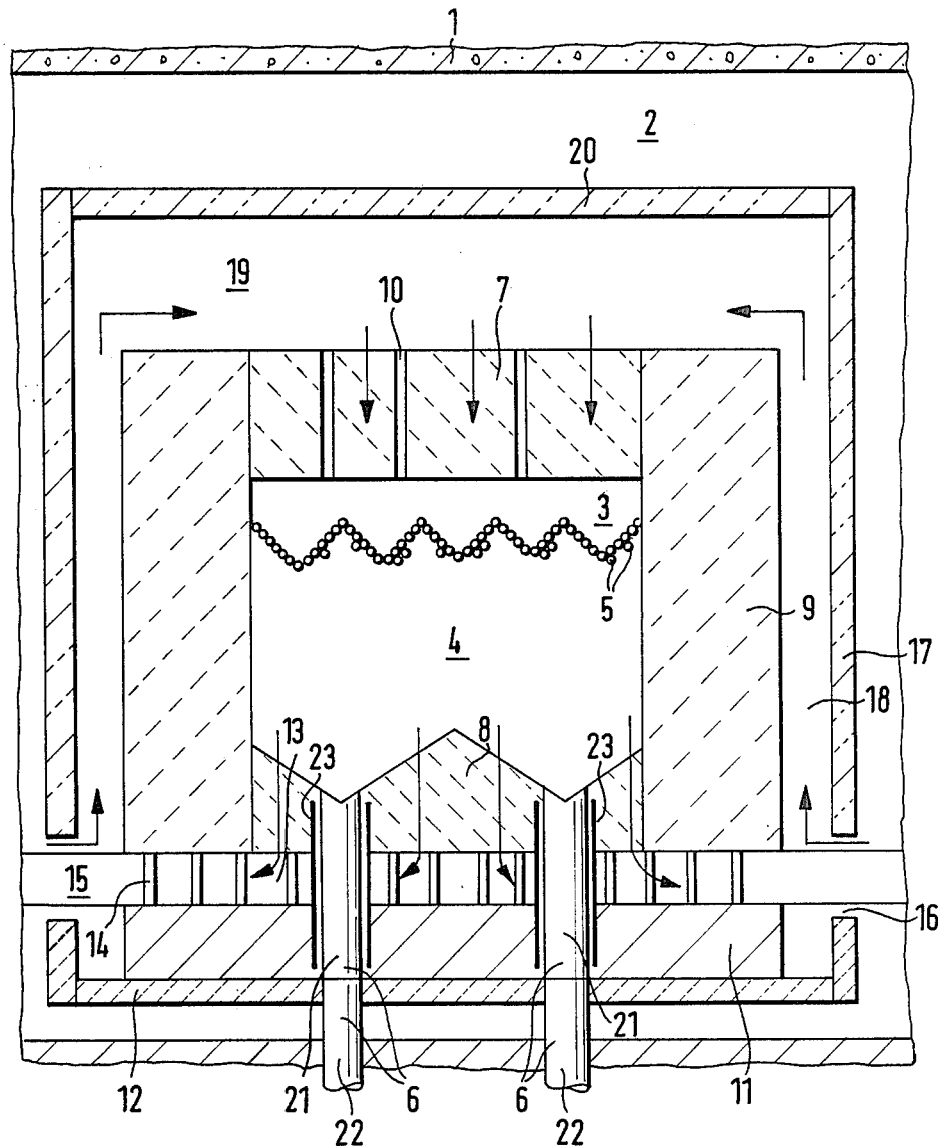
FIG. 1 shows a longitudinal section through the entire high temperature reactor.

FIG. 1 shows a reactor pressure vessel 1, for example of prestressed concrete, with a cylindrical cavity 2, wherein a high temperature reactor 3 and a number of steam generators (not shown) are installed.

The core of the high temperature reactor 3 is formed by a pile 4 of spherical fuel elements 5, which are removed by means of a pebble removal installation 6 from the pile 4. The charging installation for the fuel elements 5 is not shown. Helium as the cooling gas flows from top to bottom through the pile 4.

Figure 2:
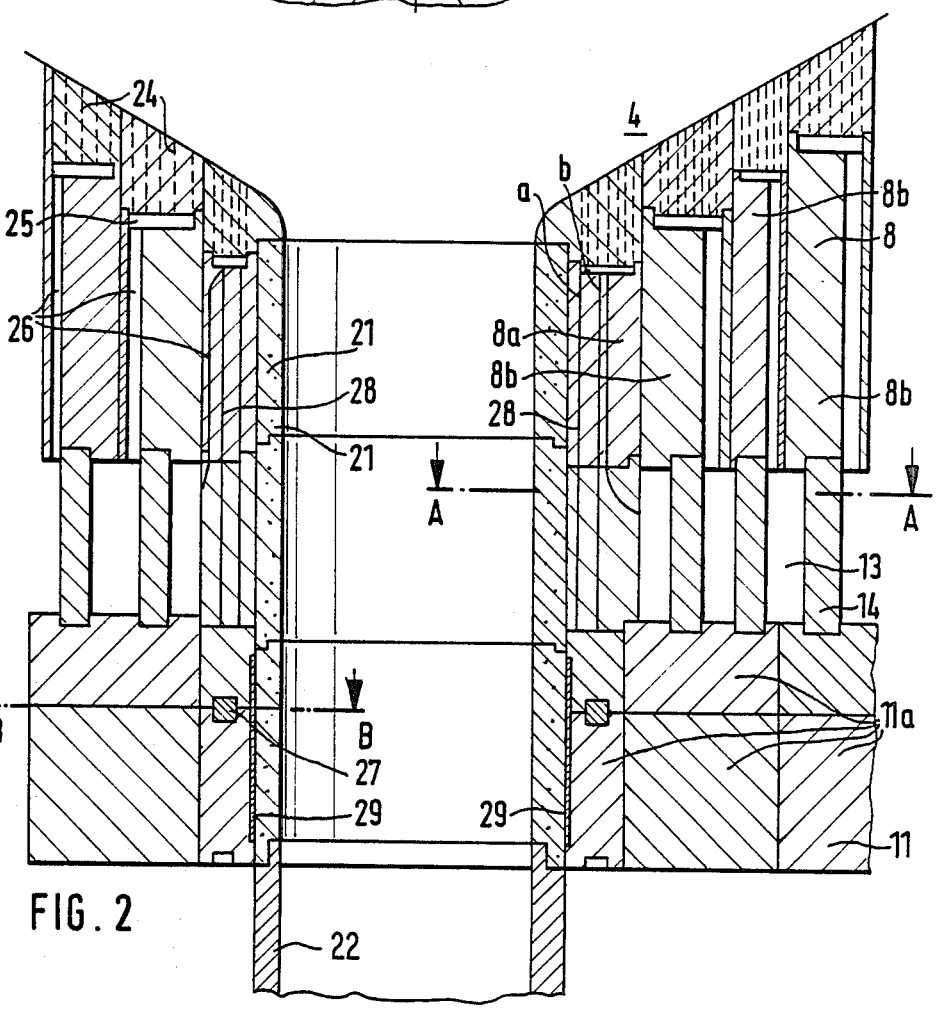
FIG. 2 shows a section of the reactor bottom with a ceramic pebble removal tube at an enlarged scale, again in a longitudinal cross section.

The pile 4 is surrounded on all sides by a graphite reflector which comprises a roof reflector 7, a bottom reflector 8 serving as the supporting floor and a cylindrical side reflector 9. In the roof reflector 7, passages 10 are provided for the absorber rods (not shown). They may be inserted directly into the pile 4. The bottom reflector 8, assembled of adjacently arranged graphite columns (as seen in FIG. 2), rests on round columns 14 supported by the bottom layers 11 of the high temperature reactor 3. A thermal bottom shield 12 adjoins the bottom layers 11 as the bottom plate.

The free space between the round columns 14 constitutes the hot gas collector compartment of the high temperature reactor 3; several hot gas conduits 15 are connected with the hot gas collector department. They communicate with the steam generators. After cooling and compression, the helium is returned through lines 16, installed coaxially with the hot gas lines 15 to the reactor core.

The side reflector 9 is surrounded by a similarly cylindrical thermal side shield 17, whereby an annular space 18 is provided between the two structural parts in communication with the lines 16. In the annular space 18, elastic supporting elements are arranged whereby the side reflector 9 is supported on the thermal side shield 17 (not shown). The annular space 18 is connected in flow with a cold gas space 19 bounded in the downward direction by the roof reflector 7 and upwardly by the thermal roof shield 20.

The pebble removal installation consists of six ceramic removal tubes 21, adjoined outside the bottom layers 11 by a metal pebble removal tube 22 each. Each ceramic pebble removal tube 21 is surrounded by a boron shield 23, as seen in more detail in FIGS. 2 and 3.

Figure 3:
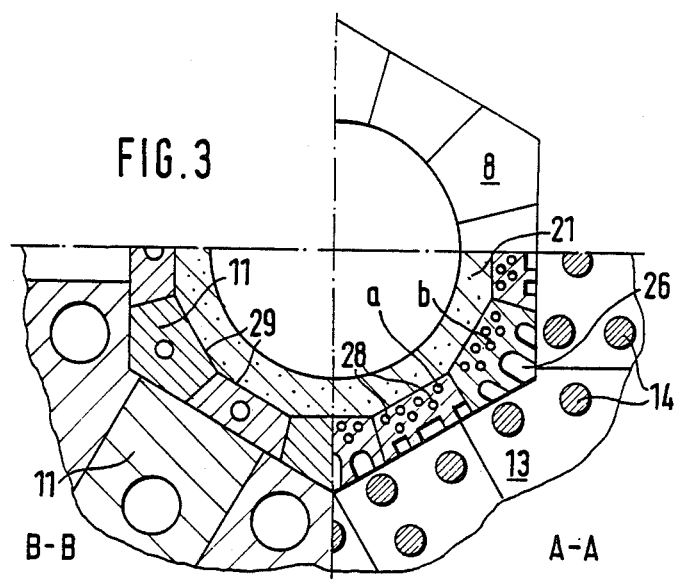
FIG. 3 shows a top view of the pebble removal tube shown in FIG. 2, together with two cross sections on the line A—A and B—B of FIG. 2.

FIGS. 2 and 3 show one of the ceramic pebble removal tubes 21 in their immediate surroundings. The bottom reflector 8 consists of graphite columns 8a and 8b, which in turn are assembled of individual graphite blocks. The uppermost of these graphite blocks have a plurality of cooling gas bores 24 which are in communication with the collector compartments 25 of the adjacent graphite blocks. By means of larger bores 26, each collector compartment 25 is connected with the hot gas collector compartment 13.

The ceramic pebble removal tube 21 is surrounded directly by a ring of graphite columns 8a, extending through the hot gas collector compartment 13 and resting directly on the bottom layers 11. The bottom layers 11 are assembled of graphite blocks 11a, maintained in position in the immediate vicinity of the ceramic pebble removal tube 21 by means of dowels 27.

The aforementioned boron shield 23 consists of a plurality of boron rods 28 and a row of solid boron plates 29. The boron rods 28 are arranged in vertical bores adapted to the rods and extending through the entire length of the graphite columns 8a. In this embodiment, two rows a and b of bores are provided; each of them arranged on a circle with the center axis of the pebble removal tube 21 as its center. The bores of the two rows a and b are staggered with respect to each other, so that the boron rods 28 are facing gaps. The boron rods 28 fill the entire length of the bores.

The solid boron plates 29 are located in the area of the bottom layers 11. They are arranged directly outside and around the ceramic pebble removal tube 21 and are shaped so that they surround the pebble removal tube 21 completely in the circumferential direction and nearly completely in the axial direction.

The boron shield 23 comprising the bodies 28 and 29 prevents any output by the fuel elements 5 in the ceramic pebble removal tubes 21, whereby the temperature in the metal pebble removal tube 22 adjacent to the removal tube 21 may be kept at an acceptable level.

We claim:

1. A gas cooled high temperature reactor comprising:
   a core of spherical fuel elements;
   a reflector surrounding said core on all sides;
   a hot gas collector compartment adjoining the lower part of said reflector;
   a plurality of first graphite columns forming the bottom of said reflector;
   a plurality of graphite blocks in layers forming the bottom of said hot gas collector compartment;
   means for removal of fuel elements from said reactor core, said means including at least one ceramic tube for the removal of spherical fuel elements from said core, said ceramic tube extending through the bottom of said reflector, said hot gas collector compartment, and said graphite block layers, and at least one metal tube for the removal of spherical fuel elements form said core, said metal tube adjoining said ceramic tube;
   a ring of second graphite columns having recesses therein and surrounding said ceramic tube in the bottom of said reflector and said hot gas collector compartment, and
   a first plurality of boron bodies arranged in said bottom of said reflector and said hot gas collector compartment in said recesses in said second graphite columns.

2. The gas cooled nuclear reactor of claim 1, further comprising a second plurality of boron bodies arranged directly around said ceramic tube.

3. The gas cooled nuclear reactor of claim 1, wherein said first plurality of boron bodies are rod-shaped and said recesses comprise vertically extending bores in said second graphite columns.

4. The gas cooled nuclear reactor of claim 3, wherein said rod-shaped boron bodies are about equal in length to said second graphite columns.

5. The gas cooled nuclear reactor of claim 3, wherein said rod-shaped boron bodies are arranged in at least two rows around said ceramic tube.

6. The gas cooled nuclear reactor of claim 5, wherein said rows of rod-shaped boron bodies are staggered with respect to one another.

7. The gas cooled nuclear reactor of claim 2, wherein said second plurality of boron bodies comprise plate-shaped members which surround said ceramic tube.

8. The gas cooled nuclear reactor of claim 1, further comprising a plurality of ceramic tubes each surrounded by a ring of graphite columns.

* * * * *